(12) United States Patent
Goto (10) Patent No.: US 7,502,386 B2
(45) Date of Patent: Mar. 10, 2009

(54) COMMUNICATION APPARATUS AND COMMUNICATION METHOD

(75) Inventor: Ikuma Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/501,918

(22) PCT Filed: Mar. 27, 2002

(86) PCT No.: PCT/JP02/02974

§ 371 (c)(1), (2), (4) Date: Jul. 27, 2004

(87) PCT Pub. No.: WO03/081878

PCT Pub. Date: Oct. 2, 2003

(65) Prior Publication Data

US 2006/0020991 A1   Jan. 26, 2006

(51) Int. Cl.
H04J 1/14 (2006.01)

(52) U.S. Cl. .................... 370/493; 348/461

(58) Field of Classification Search .............. 370/260, 370/263, 265, 328, 389, 458, 474, 529, 535; 369/47.2, 25.01, 30.19, 30.36, 275.3, 47.16; 345/553, 520, 564, 600; 386/54, 96, 94, 386/126; 725/136, 151, 59, 69; 340/825.49, 340/825.22, 825.24; 360/13, 32, 72.1; 710/68, 710/63

See application file for complete search history.

(56) References Cited

U.S. PATENT DOCUMENTS

| | | | | |
|---|---|---|---|---|
| 5,260,788 A | * | 11/1993 | Takano et al. | 348/478 |
| 5,327,176 A | * | 7/1994 | Forler et al. | 348/564 |
| 5,438,370 A | * | 8/1995 | Primiano et al. | 348/476 |
| 5,671,019 A | * | 9/1997 | Isoe et al. | 348/565 |
| 5,825,407 A | * | 10/1998 | Cowe et al. | 725/143 |
| 5,890,071 A | | 3/1999 | Shimanuki | |

(Continued)

FOREIGN PATENT DOCUMENTS

EP       0614315 A2  *  9/1994

(Continued)

OTHER PUBLICATIONS

Savitha Srinivasan et al. :Towards robust features for classifying audio in the CueVideo system; Source International Multimedia Conference archive Proceedings of the seventh ACM international conference on Multimedia (Part 1) Orlando, Florida, United States; pp. 393-400 Year of Publication: 1999.*

(Continued)

Primary Examiner—Edan Orgad
Assistant Examiner—Salman Ahmed
(74) Attorney, Agent, or Firm—Oblon, Spivak, McClelland, Maier & Neustadt, P.C.

(57) ABSTRACT

Upon receiving a call while receiving a digital broadcast, an audio path switching control unit switches an audio path to an output side of a telephone audio processing unit, and outputs telephone audio data received, when the user presses the call start/end button to end the call, the audio path switching control unit switches the audio path to the side of a digital broadcast audio processing, and outputs audio data extracted from the digital broadcast.

14 Claims, 8 Drawing Sheets

U.S. PATENT DOCUMENTS

| | | | |
|---|---|---|---|
| 6,404,818 B1* | 6/2002 | Obikane | 375/240.28 |
| 7,139,031 B1* | 11/2006 | Bray | 348/468 |
| 7,260,828 B2* | 8/2007 | Aratani et al. | 725/141 |
| 7,313,807 B2* | 12/2007 | Nishioka et al. | 725/49 |
| 2002/0007371 A1* | 1/2002 | Bray | 707/501.1 |
| 2002/0019982 A1* | 2/2002 | Aratani et al. | 725/59 |
| 2004/0168196 A1* | 8/2004 | Nishioka et al. | 725/110 |
| 2005/0022250 A1* | 1/2005 | Nishioka et al. | 725/131 |
| 2006/0051064 A1* | 3/2006 | Bray et al. | 386/95 |

FOREIGN PATENT DOCUMENTS

| | | |
|---|---|---|
| EP | 1489818 A1 * | 12/2004 |
| GB | 2 347 589 | 9/2000 |
| JP | 6-165073 | 6/1994 |
| JP | 7-30872 | 1/1995 |
| JP | 7-99685 | 4/1995 |
| JP | 07-099685 | 4/1995 |
| JP | 07-30872 A | 5/1995 |
| JP | 7-123376 | 5/1995 |
| JP | 8-125723 | 5/1996 |
| JP | 2000-196776 | 7/2000 |
| JP | 2001-54085 | 2/2001 |
| JP | 2001-054085 | 2/2001 |
| JP | 2001-285738 | 10/2001 |
| JP | 2001-308978 | 11/2001 |
| JP | 2001-309002 A | 11/2001 |
| JP | 2001-309250 | 11/2001 |
| WO | 03/081878 A1 | 10/2003 |

OTHER PUBLICATIONS

Ccljl Hsu, Alp Chen—An Approximate String Matching Algorithm for Content-Based Music Data Retrieval; Multimedia Computing and Systems, 1999. IEEE International, 1999.*

* cited by examiner

| CALL END |
|---|
| PHONE CALL SEND |
| CALL START |
| PHONE CALL RECEIVE |
| DIGITAL BROADCAST RECEPTION END |
| DIGITAL BROADCAST RECEPTION START |

(A)

| ON/OFF THE PHONE |
|---|
| DIGITAL BROADCAST WITH/WITHOUT CAPTION |
| DIGITAL BROADCAST WITH/WITHOUT AUDIO |
| DIGITAL BROADCAST WITH/WITHOUT VIDEO |
| RECEIVING/NOT RECEIVING A DIGITAL BROADCAST |

Prior Art

COMMUNICATION APPARATUS AND COMMUNICATION METHOD

TECHNICAL FIELD

The present invention relates to a communication apparatus incorporating a telephone function and a digital broadcast receiving function, and a communication method of transmitting/receiving telephone audio data and receiving a digital broadcast.

BACKGROUND ART

Rapid growth of mobile phones results greatly from the fact that they are equipped not only with the original telephone function but also with other functions such as the WEB browser function and the email function. Mobile phones are still now evolving with additional functions such as the Java application function and the video phone function.

Japan has already launched Digital Satellite Broadcasting services such as CS (Communication Satellite) and BS (Broadcasting Satellite), and scheduled to launch digitalized broadcasting services also for ground-based broadcasting in 2003. Terminals for receiving ground-based digitalized broadcasting have been developed to include even a mobile terminal for local reception, and thus preparations have been carried out for the start of the services.

Future mobile phones are projected to include functions for receiving digitalized broadcasts as well as the WEB browser function and the email function. At present, however, there seems to exist no prior art in the field of problems that the present invention is directed to solving.

Now, Japanese Unexamined Patent Publication No. Hei 6-165073 will now be cited as a related art reference.

Figure 8:
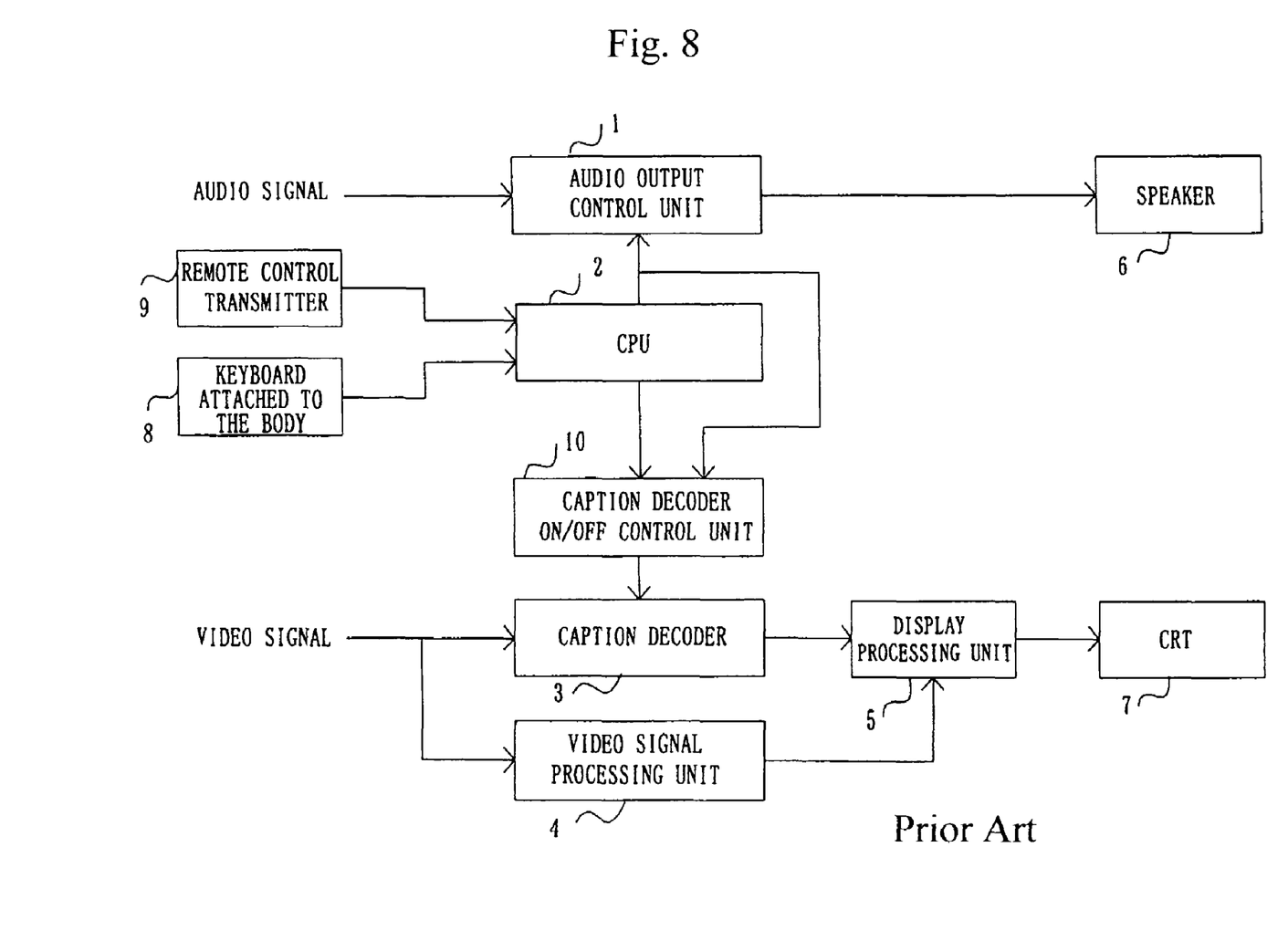
FIG. 8 shows conventional art.

FIG. 8 shows the block diagram of the reference. According to this invention, when a mute button is pressed by a remote control transmitter 9 or a keyboard 8 attached to the body, muting is activated, and at the same time a caption decoder ON/OFF control unit 10 turns on a caption decoder 3 to display multiplexed caption data via a display processing unit 5.

While muted and the caption decoder is on, on the other hand, when a demute button is pressed by the remote control transmitter 9 or the keyboard 8 attached to the body, demuting is activated and at the same time the caption decoder ON/OFF control unit 10 turns off the caption decoder 3 so that video is displayed alone via the display processing unit 5.

Japanese Unexamined Patent Publication No. Hei 6-165073 is directed to muting and displaying caption data, but not to implementing other functions.

With a projected future integration of a mobile phone and a digital broadcasting receiver, it may be assumed that a call is received or otherwise requested while a digital broadcast program is received.

Furthermore, the display of a future hybrid terminal of a mobile phone and a digital broadcast receiver can be anticipated small in size. This may pose a problem of conspicuousness with a constant caption display.

The present invention is directed to allowing calling on the phone "while" receiving a digital broadcast, and minimizing the period of caption display of a digital broadcast.

DISCLOSURE OF THE INVENTION

A communication apparatus according to the present invention is characterized by including:

a multiplexed data receiving unit for receiving multiplexed data at least including audio data;

an extracting unit for extracting the audio data from the multiplexed data;

a telephone unit for transmitting/receiving telephone audio data;

an audio output unit for inputting one of extracted audio data that was extracted by the extracting unit and received telephone audio data that was received by the telephone unit, and outputting one of the extracted audio data inputted and the received telephone audio data inputted;

a switching control unit for switching an input to the audio output unit between the extracted audio data and the received telephone audio data; and an instructing unit for detecting a receive event generation, a send event generation, and an end event generation, and giving a prescribed instruction to the telephone unit, the extracting unit, and the switching control unit.

Then, the instructing unit, in the case of detecting one of the receive event generation and the send event generation while the multiplexed data is received by the multiplexed data receiving unit, transmits a telephone audio data transmission/reception start instruction to the telephone unit to start transmitting/receiving the telephone audio data, transmits an audio data extraction stop instruction to the extracting unit to stop extracting the audio data, and transmits a received telephone audio data switch instruction to the switching control unit to switch to the received telephone audio data, and in the case of detecting the end event generation while the multiplexed data is received by the multiplexed data receiving unit, transmits a telephone audio data transmission/reception stop instruction to the telephone unit to stop transmitting/receiving the telephone audio data, transmits an audio data extraction start instruction to the extracting unit to start extracting the audio data, and transmits an extracted audio data switch instruction to the switching control unit to switch to the extracted audio data.

Then, the telephone unit, in the case of receiving the telephone audio data transmission/reception start instruction from the instructing unit, starts transmitting/receiving the telephone audio data, and in the case of receiving the telephone audio data transmission/reception stop instruction from the instructing unit, stops transmitting/receiving the telephone audio data.

Then, the extracting unit, in the case of receiving the audio data extraction stop instruction from the instructing unit, stops extracting the audio data, and in the case of receiving the audio data extraction start instruction, starts extracting the audio data.

Then, the switching control unit, in the case of receiving the received telephone audio data switch instruction from the instructing unit, switches the input to the audio output unit to the received telephone audio data, and in the case of receiving the extracted audio data switch instruction from the instructing unit, switches the input to the audio output unit to the extracted audio data.

The multiplexed data receiving unit is characterized by receiving multiplexed data including video data and text data.

Then, the extracting unit is characterized by extracting the video data from the multiplexed data, and also extracts the text data in a prescribed case.

Then, the communication apparatus is characterized by further including a display output unit for outputting extracted video data that was extracted by the extracting unit, and for outputting extracted text data in the case where the text data was extracted by the extracting unit.

Then, the instructing unit is characterized by transmitting a text data extraction start instruction to the extracting unit to start extracting the text data in the case of detecting one of the receive event generation and the send event generation while the multiplexed data is received by the multiplexed data receiving unit, and transmitting a text data extraction stop instruction to the extracting unit to stop extracting the text data in the case of detecting the end event generation while the multiplexed data is received by the multiplexed data receiving unit.

Then, the extracting unit is characterized by starting extracting the text data in the case of receiving the text data extraction start instruction from the instructing unit, and stopping extracting the text data in the case of receiving the text data extraction stop instruction from the instructing unit.

The audio output unit is characterized by being an amplified audio output unit for amplifying volume of and then outputting one of the extracted audio data inputted and the received telephone audio data inputted and outputting.

Then, the communication apparatus is characterized by further including:

a ear audio output unit for outputting the received telephone audio data in a prescribed case; and an amplified audio ear audio selecting unit for selecting one of the amplified audio output unit and the ear audio output unit, and making the one of the amplified audio output unit and the ear audio output unit output the received telephone audio data based on a selected result.

Then, the instructing unit is characterized by transmitting an amplified audio select instruction to the amplified audio ear audio selecting unit to select the amplified audio output unit in the case of detecting one of the receive event generation and the send event generation while the multiplexed data is received by the multiplexed data receiving unit.

Then, the amplified audio ear audio selecting unit is characterized by selecting the amplified audio output unit in the case of receiving the amplified audio select instruction from the instructing unit, and making the amplified audio output unit output the received telephone audio data.

The communication apparatus is characterized by further including:

a multiplexed data reception start time managing unit, for managing time for the multiplexed data receiving unit to start receiving the multiplexed data as multiplexed data reception start time, transmitting with an arrival of the multiplexed data reception start time a multiplexed data reception start instruction to the multiplexed data receiving unit to start receiving the multiplexed data, and transmitting a multiplexed data reception start notification to the instructing unit of a start of receiving the multiplexed data by the multiplexed data receiving unit.

Then, the multiplexed data receiving unit is characterized by starting receiving the multiplexed data in the case of receiving the multiplexed data reception start instruction from the multiplexed data reception start time managing unit.

Then, the instructing unit is characterized by judging whether the telephone audio data is being transmitted/received by the telephone unit upon receiving the multiplexed data reception start notification from the multiplexed data reception start time managing unit, and transmitting the audio data extraction stop instruction to the extracting unit in the case where the telephone audio data is being transmitted/received by the telephone unit, so that the instructing unit does not transmits the extracted audio data switch instruction to the switching control unit.

The communication apparatus is characterized by further including:

a multiplexed data reception start time managing unit, for managing time for the multiplexed data receiving unit to start receiving the multiplexed data as multiplexed data reception start time, transmitting with an arrival of the multiplexed data reception start time a multiplexed data reception start instruction to the multiplexed data receiving unit to start receiving the multiplexed data, and transmitting a multiplexed data reception start notification to the instructing unit of a start of receiving the multiplexed data by the multiplexed data receiving unit.

Then, the multiplexed data receiving unit is characterized by starting receiving the multiplexed data in the case of receiving the multiplexed data reception start instruction from the multiplexed data reception start time managing unit.

Then, the instructing unit is characterized by judging whether the telephone audio data is being transmitted/received by the telephone unit upon receiving the multiplexed data reception start notification from the multiplexed data reception start time managing unit, and transmitting the text data extraction start instruction to the extracting unit in the case where the telephone audio data is being transmitted/received by the telephone unit.

The communication apparatus is characterized by further including:

a vibrator; and a vibrator control unit for controlling the vibrator.

Then, the instructing unit is characterized by judging whether the telephone audio data is being transmitted/received by the telephone unit in the case of receiving the multiplexed data reception start notification from the multiplexed data reception start time managing unit, and transmitting a vibrator start instruction to the vibrator control unit to start the vibrator in the case where the telephone audio data is being transmitted/received by the telephone unit.

Then, the vibrator control unit is characterized by starting the vibrator in the case of receiving the vibrator start instruction from the instructing unit.

The communication apparatus is characterized by being a mobile type communication apparatus.

A communication method according to the present invention is characterized by including:

a multiplexed data receiving step for receiving multiplexed data at least including audio data;

an extracting step for extracting the audio data from the multiplexed data;

a telephone audio data transmitting/receiving step for transmitting/receiving telephone audio data;

an audio output step for inputting one of extracted audio data that was extracted by the extracting step and received telephone audio data that was received by the telephone audio data transmitting/receiving step, and outputting one of the extracted audio data inputted and the received telephone audio data inputted;

a switching control step for switching an input to the audio output step between the extracted audio data and the received telephone audio data; and an instructing step for detecting a receive event generation, a send event generation, and an end event generation, and giving a prescribed instruction to the telephone audio data transmitting/receiving step, the extracting step, and the switching control step.

Then, the instructing step, in the case of detecting one of the receive event generation and the send event generation while the multiplexed data is received by the multiplexed data receiving step, gives a telephone audio data transmission/reception start instruction to the telephone audio transmitting/receiving step to start transmitting/receiving the telephone audio data, gives an audio data extraction stop instruction to the extracting step to stop extracting the audio data, and gives a received telephone audio data switch instruction to the switching control step to switch to the received telephone audio data, and in the case of detecting the end event generation while the multiplexed data is received by the multiplexed data receiving step, gives a telephone audio data transmission/reception stop instruction to the telephone audio transmitting/receiving step to stop transmitting/receiving the telephone audio data, gives an audio data extraction start instruction to the extracting step to start extracting the audio data, and gives an extracted audio data switch instruction to the switching control step to switch to the extracted audio data.

Then, the telephone audio transmitting/receiving step, in the case of receiving the telephone audio data transmission/reception start instruction from the instructing step, starts transmitting/receiving the telephone audio data, and in the case of receiving the telephone audio data transmission/reception stop instruction from the instructing step, stops transmitting/receiving the telephone audio data.

Then, the extracting step, in the case of receiving the audio data extraction stop instruction from the instructing step, stops extracting the audio data, and in the case of receiving the audio data extraction start instruction, starts extracting the audio data.

Then, the switching control step, in the case of receiving the received telephone audio data switch instruction from the instructing step, switches the input to the audio output step to the received telephone audio data, and in the case of receiving the extracted audio data switch instruction from the instructing step, switches the input to the audio output step to the extracted audio data.

The multiplexed data receiving step is characterized by receiving multiplexed data including video data and text data.

Then, the extracting step is characterized by extracting the video data from the multiplexed data, and also extracting the text data in a prescribed case.

Then, the communication method is characterized by further including:

a display output step for outputting extracted video data that was extracted by the extracting step, and in the case where the text data was extracted by the extracting step, outputting extracted text data that was extracted.

Then, the instructing step is characterized by giving a text data extraction start instruction to the extracting step to start extracting the text data in the case of detecting one of the receive event generation and the send event generation while the multiplexed data is received by the multiplexed data receiving step, and giving a text data extraction stop instruction to the extracting step to stop extracting the text data in the case of detecting the end event generation while the multiplexed data is received by the multiplexed data receiving step.

Then, the extracting step is characterized by starting extracting the text data in the case of receiving the text data extraction start instruction from the instructing step, and stopping extracting the text data in the case of receiving the text data extraction stop instruction from the instructing step.

BEST MODE FOR CARRYING OUT THE INVENTION

Embodiment 1

Figure 1:
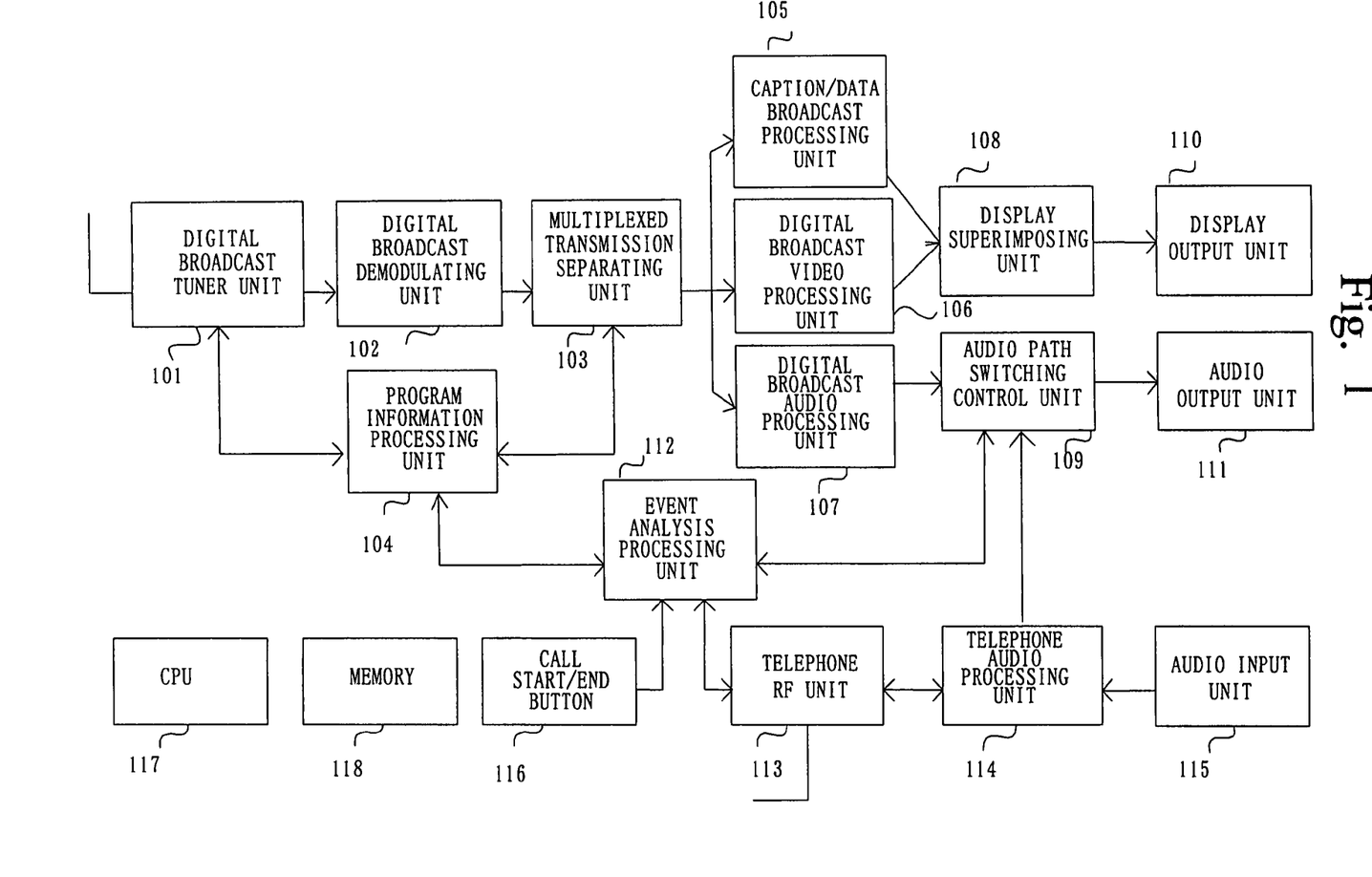
FIG. 1 is a block diagram of a hybrid terminal of a mobile phone and a digital broadcast receiver according to a first embodiment.

FIG. 1 shows a hybrid terminal for mobile phone and digital broadcast reception according to a first embodiment of the present invention. With referring to the figure, a reference numeral 101 denotes a digital broadcast tuner unit, a reference numeral 102 denotes a digital broadcast demodulating unit, a reference numeral 103 denotes a multiplexed transmission separating unit, a reference numeral 104 denotes a program information processing unit, a reference numeral 105 denotes a caption/data broadcast processing unit, a reference numeral 106 denotes a digital broadcast video processing unit, a reference numeral 107 denotes a digital broadcast audio processing unit, a reference numeral 108 denotes a display superimposing unit, a reference numeral 109 denotes an audio path switching control unit, a reference numeral 110 denotes a display output unit, a reference numeral 111 denotes an audio output unit, a reference numeral 112 denotes an event analysis processing unit, a reference numeral 113 denotes a telephone RF unit, a reference numeral 114 denotes a telephone audio processing unit, a reference numeral 115 denotes an audio input unit, a reference numeral 116 denotes a call start/end button, a reference numeral 117 denotes a CPU, and a reference numeral 118 denotes a memory.

The digital broadcast tuner unit 101 receives a digital broadcast wave including video data, audio data, and caption data (text data) multiplexed. The digital broadcast tuner unit 101 is an example of a multiplexed data receiving unit, and the digital broadcast wave that the digital broadcast tuner unit 101 receives is an example of multiplexed data.

The digital broadcast demodulating unit 102 demodulates the digital broadcast wave received at the digital broadcast tuner unit 101.

The multiplexed transmission separating unit 103 separates a relevant stream or section data from the multiplexed data (extracting video data, audio data, etc.). This is well known art in digital broadcast processing, and therefore will not be elaborated here. The multiplexed transmission separating unit 103 stops separating digital broadcast audio data and starts separating caption data in a prescribed case. It is to be noted that the multiplexed transmission separating unit 103 is an example of an extracting unit. Also, video data separated by the multiplexed transmission separating unit 103 corresponds to extracted video data, audio data separated by the multiplexed transmission separating unit 103 corresponds to extracted audio data, and caption data separated by the multiplexed transmission separating unit 103 corresponds to extracted text data.

The program information processing unit 104 can judge the presence or absence of monomedia, such as video data, audio data, and caption data (text data) that are multiplexed in a broadcast program, and a data broadcast, and know the separation information thereof based on incoming program information carried by the digital broadcast wave. This is well known art in digital broadcast processing, and therefore will not be elaborated here. Also, the program information processing unit 104 gives instructions with reference to program information to the multiplexed transmission separating unit 103 to stop separating the audio data of a digital broadcast, and to start separating caption data if the digital broadcast includes the caption data. In the absence of caption data, the program information processing unit 104 gives instructions only to stop separating the audio data of a digital broadcast and perform muting.

It is to be noted that the program information processing unit 104, as well as the event analysis processing unit 112 which is described later, corresponds to an example of an instructing unit.

The caption/data broadcast processing unit 105 performs data processing required for displaying caption data and various types of other data (such as decoding caption data).

The digital broadcast video processing unit 106 performs data processing required for displaying video data (such as decoding video data).

The digital broadcast audio processing unit 107 performs data processing required for outputting audio data (such as decoding audio data). Also, it mutes audio data in a prescribed case.

The display superimposing unit 108 has the function of superimposing video data onto different video data, or superimposing caption data onto video data. Also, it displays superimposed video data or caption data on the display output unit 110. This is well known art in digital broadcast processing, and therefore will not be elaborated here.

The display output unit 110 displays data superimposed by the display superimposing unit 108.

The audio path switching control unit 109 switches the audio path (input to the audio output unit 111) to the telephone side or the digital broadcast audio side, and makes audio output through the audio output unit 111. It is to be noted that the audio path switching control unit 109 is an example of a switching control unit.

The audio output unit 111 outputs telephone audio data from the telephone audio processing unit 114 when the audio path is on the telephone side, and outputs audio data from the digital broadcast audio processing unit 107 when the audio path is on the digital broadcast audio side.

The event analysis processing unit 112 gives instructions to the program information processing unit 104 to mute a digital broadcast and display caption data, upon receiving or transmitting a call while the user is watching and listening to the digital broadcast. Also, the event analysis processing unit 112 at the same time gives instructions to the audio path switching control unit 109 to switch the audio path to the output side of the telephone audio processing unit. Also, when the user ends a call while at the same time receiving a digital broadcast, the event analysis processing unit 112 gives instructions to the program information processing unit 104 to restore the audio data of the digital broadcast and delete the caption data. Still also, the event analysis processing unit 112 gives instructions to the audio path switching control unit 109 to switch the audio path to the output side of the digital broadcast audio processing unit 107.

It is to be noted that a combination of the event analysis processing unit 112 and the program information processing unit 104 corresponds to an instructing unit.

The telephone RF unit 113, the telephone audio processing unit 114, the audio input unit 115 and the call start/end button 116 are components for implementing the telephone function and correspond to a telephone unit if combined.

Also, the hybrid terminal according to this embodiment is an example of a communication apparatus.

An operation will now be discussed.

Firstly, a description will be given of the case of receiving a call while the user is watching and listening to a digital broadcast program.

This case includes the situation that a digital broadcast wave is being received by the digital broadcast tuner unit 101, the separation processing of video data and audio data is being performed in the multiplexed transmission separating unit 103, video data is being outputted from the display output unit 110, and audio data is being outputted from the audio output unit 111. Meanwhile, the audio path is set on the side of the digital broadcast audio by the audio path switching control unit 109.

Upon receiving a call while the user is watching and listening to a digital broadcast program, the telephone RF unit 113 sends a receive event to the event analysis processing unit 112.

The event analysis processing unit 112 detects the receive event and gives instructions to the program information processing unit 104 to mute the digital broadcast audio and display the caption data. At the same time, the event analysis processing unit 112 transmits an instruction message (received telephone audio data switch instruction) to the audio path switching control unit 109, instructing to switch the audio path to the output side of the telephone audio processing unit 114.

The program information processing unit 104 transmits an instruction message to the multiplexed transmission separating unit 103 with reference to the program information. More specifically, the program information processing unit 104 transmits an instruction message to stop separating the audio data of the digital broadcast (audio data extraction stop instruction). In the case of having caption data, the program information processing unit 104 transmits an instruction message to start separating the caption data (text data extraction start instruction). Without having caption data, it instructs to stop separating the audio data of the digital broadcast only.

The multiplexed transmission separating unit 103 stops separating the audio data of the digital broadcast and starts separating the caption data. The digital broadcast audio processing unit 107 performs muting and the caption/data broadcast processing unit 105 decodes the caption data.

The display superimposing unit 108 superimposes the caption data onto the video data and displays it on the display output unit 110.

In the meantime, the audio path switching control unit 109 switches the audio path to the telephone side.

When the user presses the call start/end button 116, the event analysis processing unit 112 receives a call start event and transmits an instruction message (telephone audio data transmission/reception start instruction) to the telephone RF unit 113, indicating to start transmitting/receiving telephone audio data, so as to make a call start.

The same process is applicable to the case where the user makes a phone call while watching and listening a digital broadcast program.

More particularly, when the user presses the call start/end button 116, the event analysis processing unit 112 detects a send event, and instructs the program information processing unit 104 to mute the digital broadcast audio and display the caption data. At the same time, the event analysis processing unit 112 transmits an instruction message (received telephone audio data switch instruction) to the audio path switching control unit 109 to switch the audio path to the output side of the telephone audio processing unit 114.

Then, the program information processing unit 104, with reference to the program information, transmits to the multiplexed transmission separating unit 103 an instruction message (audio data extraction stop instruction) to stop separating the audio data of the digital broadcast, and an instruction message (text data extraction start instruction) to start separating the caption data with the presence of the caption data. The multiplexed transmission separating unit 103 stops separating the audio data of the digital broadcast and starts separating the caption data. The digital broadcast audio processing unit 107 starts muting and the caption/data broadcast processing unit 105 starts decoding the caption data.

The display superimposing unit 108 superimposes the caption data onto the video data, and displays it on the display output unit 110.

In the meantime, the audio path switching control unit 109 switches the audio path to the telephone side.

Also, in the meantime, the event analysis processing unit 112 transmits an instruction message (telephone audio data transmission/reception start instruction) to the telephone RF unit 113 to start transmitting/receiving telephone audio data so as to make a call start.

An operation will be discussed of the case where the user ends a call.

It is to be noted that this case includes the situation that a digital broadcast wave is being received by the digital broadcast tuner unit 101, and the separation of video data and caption data is in process in the multiplexed transmission separating unit 103, whereas the separation of audio data is stopped, and the video data and the caption data are being outputted from the display output unit 110. In the meantime, telephone audio data is being transmitted/received through the telephone RF unit 113, the telephone audio processing unit 114, and the audio input unit 115, and telephone audio data is being outputted from the audio output unit 111. Also, in the meantime, the audio path is set on the telephone side by the audio path switching control unit 109.

When the user presses the call start/end button 116, the event analysis processing unit 112 detects an end event, and transmits an instruction message (telephone audio data transmission/reception stop instruction) to the telephone RF unit 113 so as to make the call end.

If a dialoguer (the other party) ends the call first, then the telephone RF unit 113 gives the end event to the event analysis processing unit 112.

Also, the event analysis processing unit 112 at the same time instructs the program information processing unit 104 to start separating the audio data of the digital broadcast (digital broadcast audio return) and stop separating the caption data (caption deletion). Still also, the event analysis processing unit 112 transmits an instruction message (extracted audio data switch instruction) to the audio path switching control unit 109 to switch the audio path to the output side of the digital broadcast audio processing unit 107.

The program information processing unit 104 transmits an instruction message (audio data extraction start instruction and text data extraction stop instruction) to the multiplexed transmission separating unit 103, instructing to start separating the audio data of the digital broadcast and stop separating the caption data.

The multiplexed transmission separating unit 103 starts separating the audio data of the digital broadcast and stop separating the caption data, and the digital broadcast audio processing unit 107 starts decoding the audio and the caption/data broadcast processing unit 105 stops decoding the caption data.

As a result, the display superimposing unit 108 displays video data outputted from the digital broadcast video processing unit 106 alone on the display output unit 110.

The audio path switching control unit 109, upon receiving the instruction message from the event analysis processing unit 112, switches the audio path to the digital broadcast audio side and makes the audio data of the digital broadcast output from the audio output unit 111.

Figure 2:
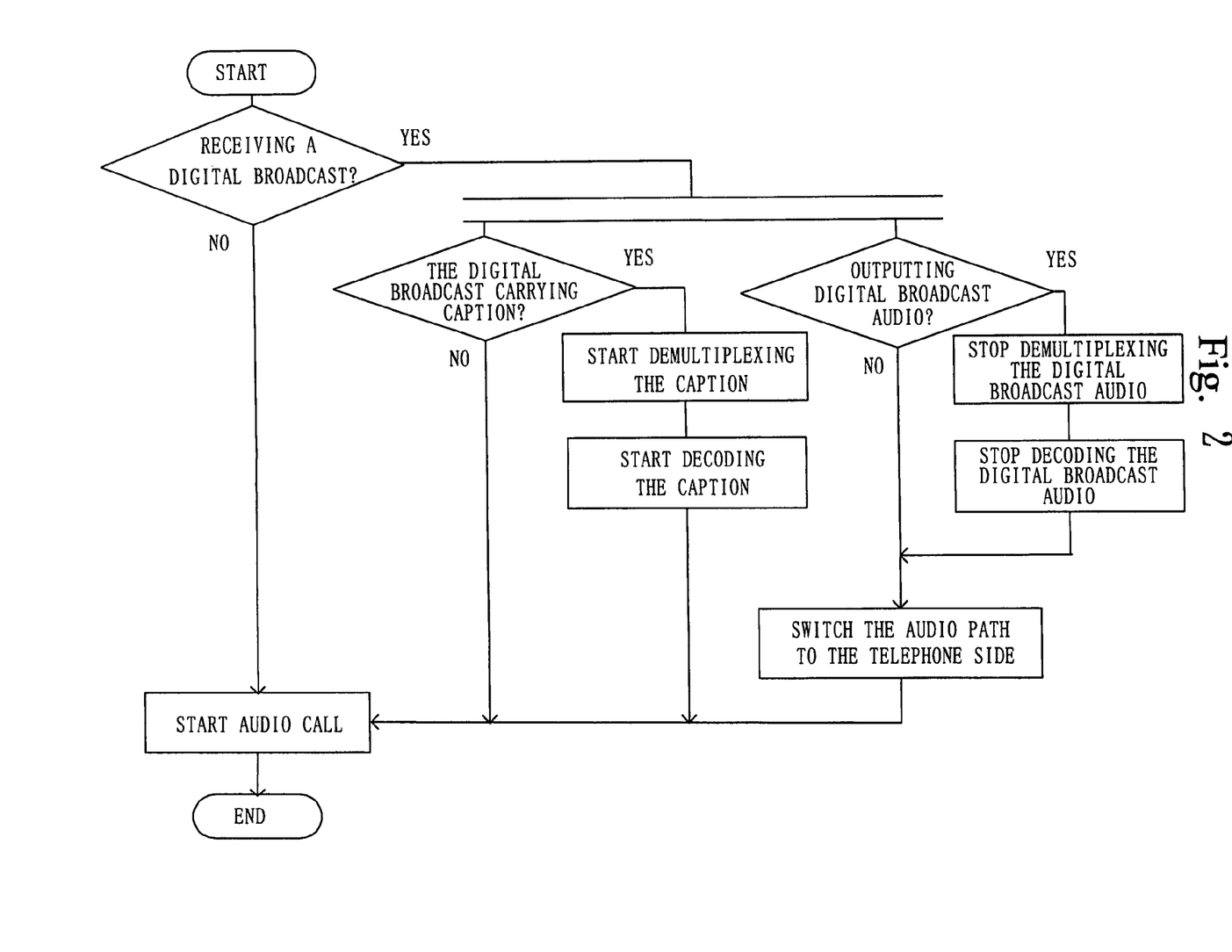
FIG. 2 is a flowchart illustrating a control flow for receiving a phone call.
Figure 3:
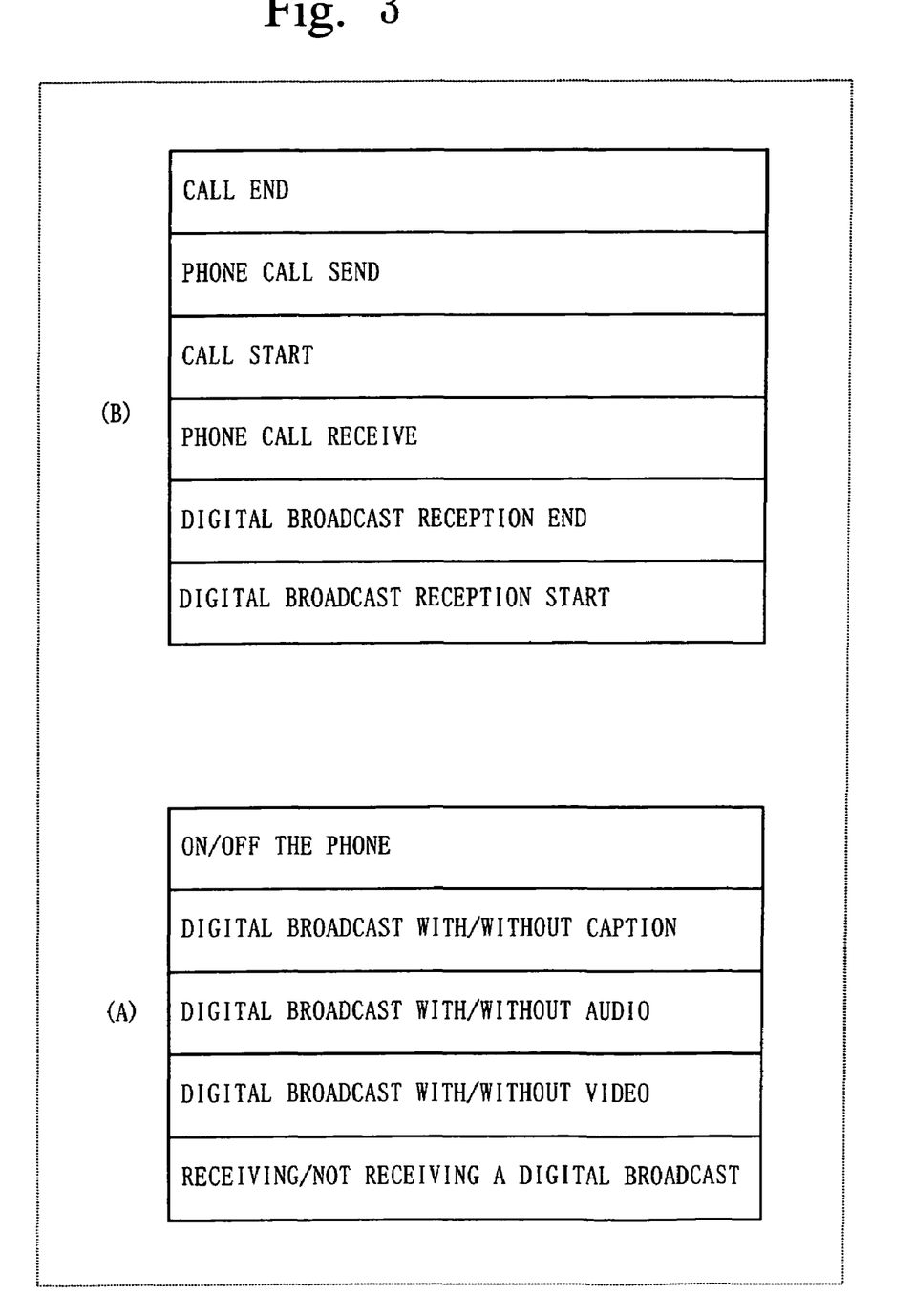
FIG. 3 is a diagram illustrating events and states that are managed by an event analysis processing unit.

FIG. 2 shows a flow of an internal operation of the hybrid terminal upon receiving/transmitting a call. FIG. 3 shows an example of events/states that the event analysis processing unit handles. FIG. 3(a) includes the states to be managed by the event analysis processing unit. FIG. 3(b) includes events to be managed by the event analysis processing unit.

The thus configured hybrid terminal of a mobile phone and a digital broadcast receiver allows providing the user with calling and receiving a digital broadcast upon receiving/transmitting a call while at the same time receiving the digital broadcast. In addition, this hybrid terminal, being thus designed to displaying caption data only while the phone is used, allows reducing the period of displaying caption data on a small screen.

Embodiment 2

Figure 4:
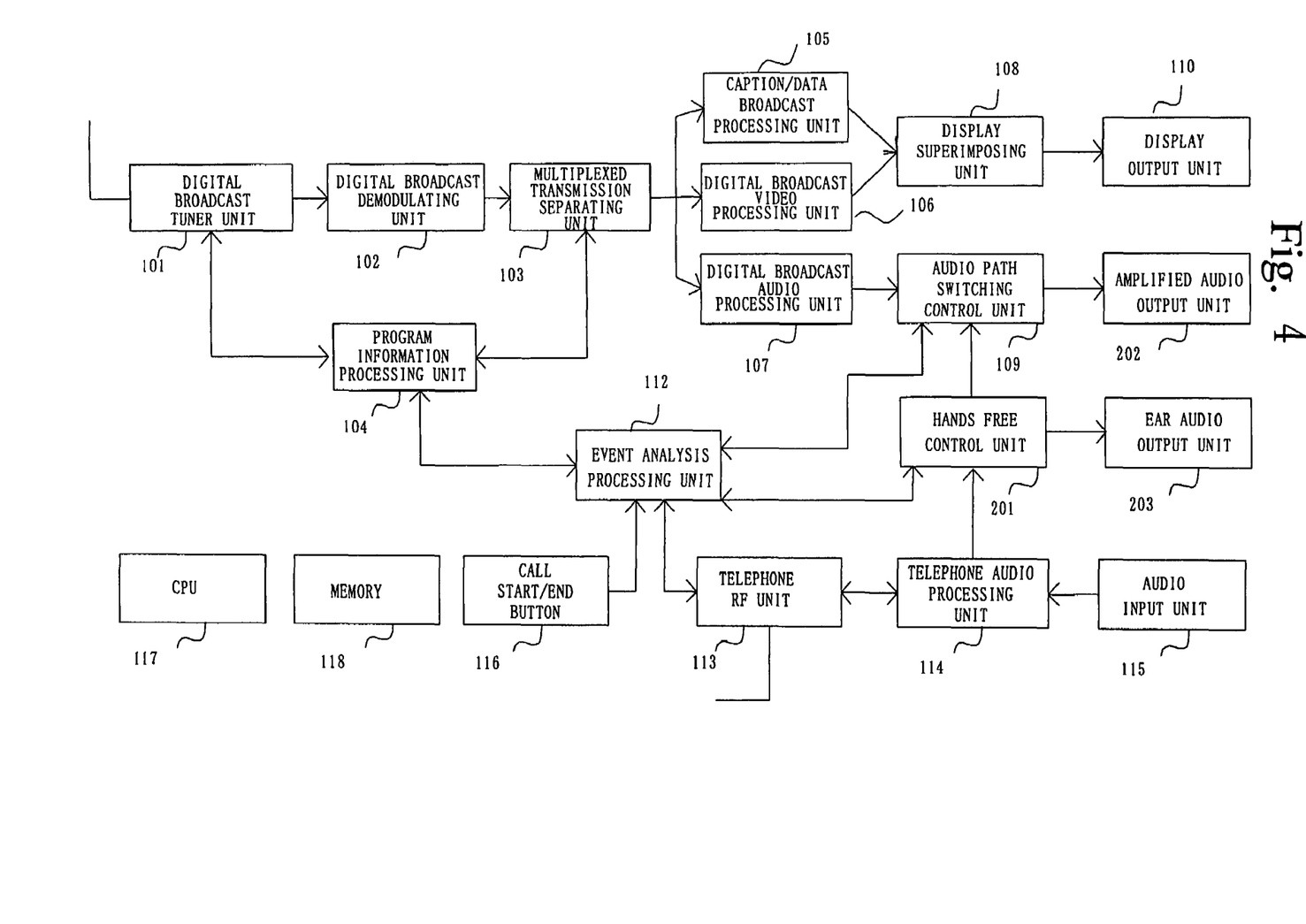
FIG. 4 is a block diagram of a hybrid terminal of a mobile phone and a digital broadcast receiver according to a second embodiment.

FIG. 4 shows a hybrid terminal of a mobile phone equipped with a hands free function and a digital broadcast receiver according to a second embodiment of the present invention. With referring to the figure, a reference numeral 101 denotes a digital broadcast tuner unit, a reference numeral 102 denotes a digital broadcast demodulating unit, a reference numeral 103 denotes a multiplexed transmission separating unit, a reference numeral 104 denotes a program information processing unit, a reference numeral 105 denotes a caption/data broadcast processing unit, a reference numeral 106 denotes a digital broadcast video processing unit, a reference numeral 107 denotes a digital broadcast audio processing unit, a reference numeral 108 denotes a display superimposing unit, a reference numeral 109 denotes an audio path switching control unit, a reference numeral 110 denotes a display output unit, a reference numeral 111 denotes an audio output unit, a reference numeral 112 denotes an event analysis processing unit, a reference numeral 113 denotes a telephone RF unit, a reference numeral 114 denotes a telephone audio processing unit, a reference numeral 115 denotes an audio input unit, a reference numeral 116 denotes a call start/end button, a reference numeral 117 denotes a CPU, a reference numeral 118 denotes a memory, a reference numeral 201 denotes a hands free control unit, a reference numeral 202 denotes an amplified audio output unit, and a reference numeral 203 denotes a ear audio output unit.

The amplified audio output unit 202 is to output the telephone audio data of the mobile phone in the hands free mode and the audio data of a digital broadcast. The ear audio output unit 203 is to output the telephone audio data of the mobile phone in the normal mode.

The hands free control unit 201 provides on/off control of the hands free function. The hands free function is well known art of mobile phone, and therefore will not be elaborated here. It is to be noted that the hands free control unit 201 is an example of an amplified audio ear audio selecting unit.

Similarly to the first embodiment, the audio path is switched to the telephone side by the event analysis processing unit 112 upon receiving/transmitting a mobile phone call while at the same time receiving a digital broadcast. In this case, however, the event analysis processing unit 112 makes a request to the hands free control unit 201 for turning on the hands free mode (transmitting an amplified audio selection instruction), and the hands free control unit 201 turns on the hands free mode (selecting an amplified audio output unit.) It is to be noted that the other parts of processing is the same as those discussed in the first embodiment.

The thus configured hybrid terminal of a mobile phone and a digital broadcast receiver, being designed to automatically select the hands free mode upon receiving a call while at the same time receiving a digital broadcast, allows a pleasant call on the mobile phone while at the same time receiving a digital broadcast.

Embodiment 3

Figure 5:
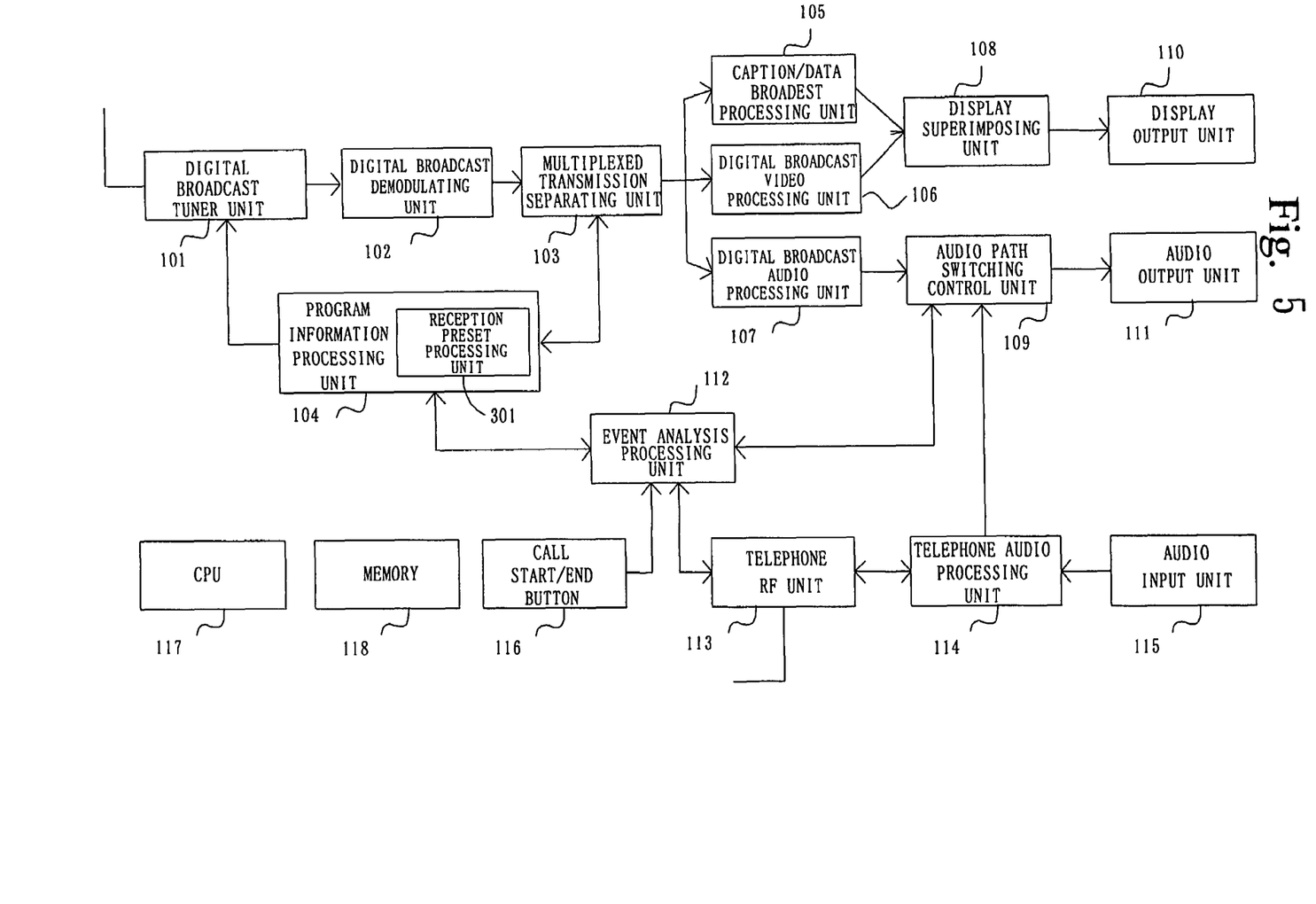
FIG. 5 is a block diagram of a hybrid terminal of a mobile phone and a digital broadcast receiver according to a third embodiment.

FIG. 5 shows a hybrid terminal of a mobile phone capable of presetting reception of programs and a digital broadcast receiver according to a third embodiment of the present invention. With referring to the figure, a reference numeral 101 denotes a digital broadcast tuner unit, a reference numeral 102 denotes a digital broadcast demodulating unit, a reference numeral 103 denotes a multiplexed transmission separating unit, a reference numeral 104 denotes a program information processing unit, a reference numeral 105 denotes a caption/data broadcast processing unit, a reference numeral 106 denotes a digital broadcast video processing unit, a reference numeral 107 denotes a digital broadcast audio processing unit, a reference numeral 108 denotes a display superimposing unit, a reference numeral 109 denotes an audio path switching control unit, a reference numeral 110 denotes a display output unit, a reference numeral 111 denotes an audio output unit, a reference numeral 112 denotes an event analysis processing unit, a reference numeral 113 denotes a telephone RF unit, a reference numeral 114 denotes a telephone audio processing unit, a reference numeral 115 denotes an audio input unit, a reference numeral 116 denotes a call start/end button, a reference numeral 117 denotes a CPU, a reference numeral 118 denotes a memory, and a reference numeral 301 denotes a reception preset processing unit.

The reception preset processing unit 301 analyzes the schedule of a program based on program information that is transmitted via a digital broadcast wave, and presets the program for reception. This is well known art in digital broadcast processing, and therefore will not be elaborated here. It is to be noted that the reception preset processing unit 301 is a multiplexed data reception start time managing unit.

According to the third embodiment of the present invention, when a preset program for reception starts via a preset function of the reception preset processing unit 301, the reception preset processing unit 301 instructs the digital broadcast tuner unit 101 to start a reception (transmitting a multiplexed data reception start instruction), and at the same time gives a reception start event to the event analysis processing unit 112 (transmitting a multiplexed data reception start notification). The event analysis processing unit 112 judges whether or not the user is on the telephone, and in other words judges whether or not telephone audio data is being transmitted/received.

When the user is on the telephone (telephone audio data is being transmitted/received), the event analysis processing unit 112 instructs the program information processing unit 104 to mute the digital broadcast audio and display the caption data. Also, the event analysis processing unit 112, without instructing the audio path switching control unit 109 to switch the audio path, keeps the audio path on the telephone side. It is to be noted that the other parts of processing is the same as those discussed in the first embodiment.

Figure 6:
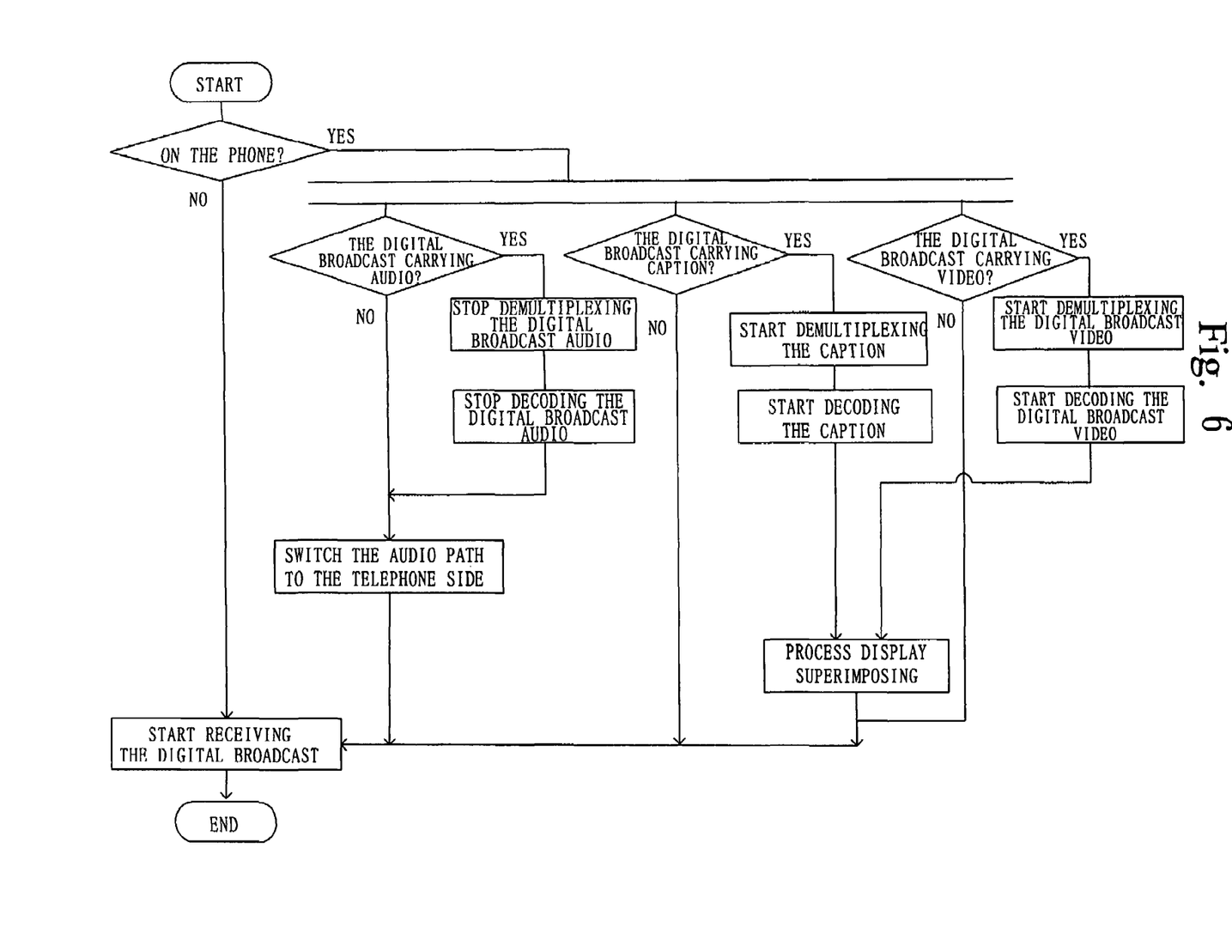
FIG. 6 is a flowchart illustrating a control flow for starting the reception of a digital broadcast.

FIG. 6 shows a control flow upon starting to receive a digital broadcast.

It is desirable that the hands free mode is selected for calling as discussed in the second embodiment.

The thus configured hybrid terminal of a mobile phone and a digital broadcast receiver allows using the mobile phone while at the same time receiving a digital broadcast, even if a digital broadcast program preset for reception started while using the phone.

Embodiment 4

Figure 7:
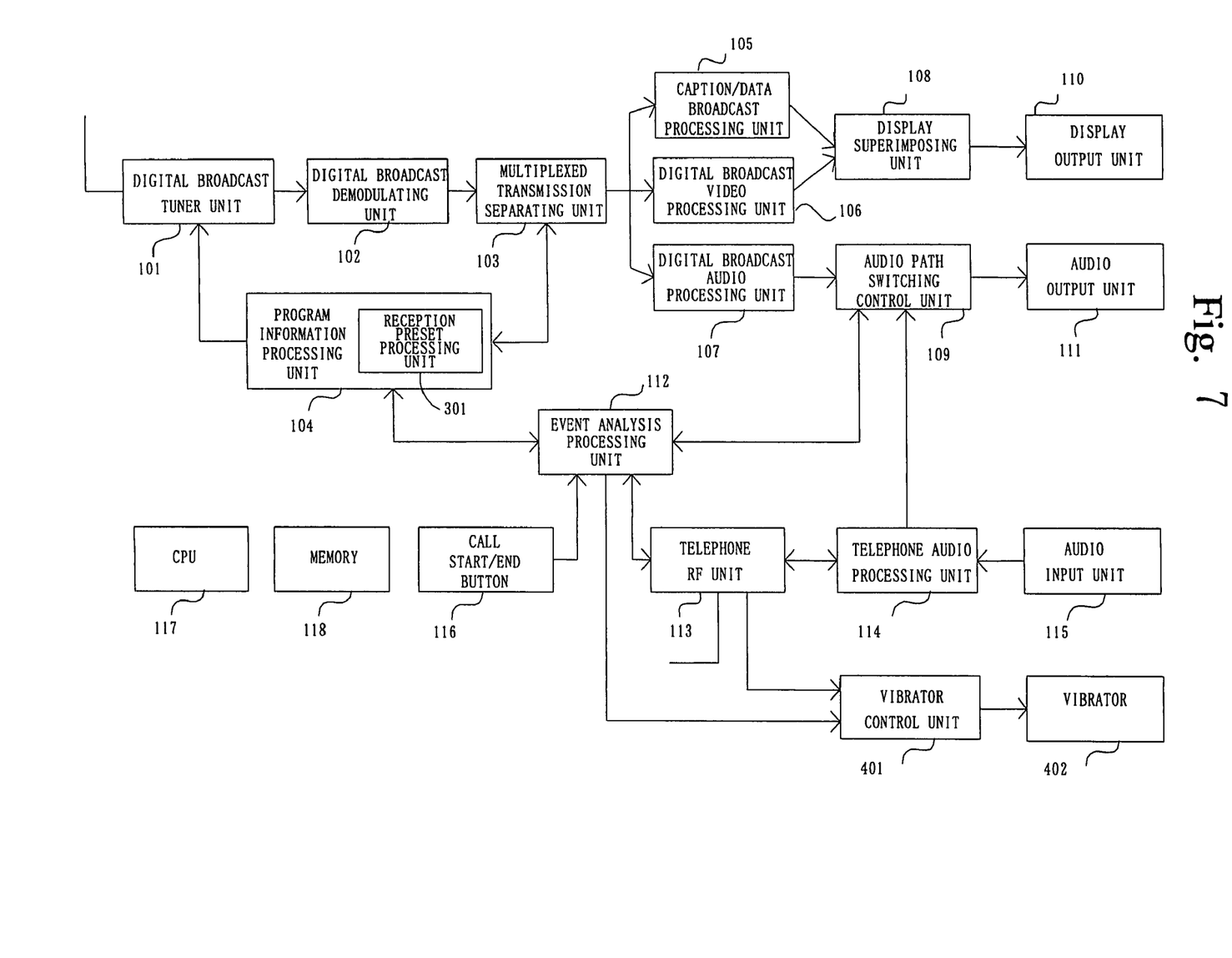
FIG. 7 is a block diagram of a hybrid terminal of a mobile phone and a digital broadcast receiver according to a fourth embodiment.

FIG. 7 shows a hybrid terminal of a mobile phone capable of presetting reception of programs and a digital broadcast receiver according to a fourth embodiment of the present invention. With referring to the figure, a reference numeral 101 denotes a digital broadcast tuner unit, a reference numeral 102 denotes a digital broadcast demodulating unit, a reference numeral 103 denotes a multiplexed transmission separating unit, a reference numeral 104 denotes a program information processing unit, a reference numeral 105 denotes a caption/data broadcast processing unit, a reference numeral 106 denotes a digital broadcast video processing unit, a reference numeral 107 denotes a digital broadcast audio processing unit, a reference numeral 108 denotes a display superimposing unit, a reference numeral 109 denotes an audio path switching control unit, a reference numeral 110 denotes a display output unit, a reference numeral 111 denotes an audio output unit, a reference numeral 112 denotes an event analysis processing unit, a reference numeral 113 denotes a telephone RF unit, a reference numeral 114 denotes a telephone audio processing unit, a reference numeral 115 denotes an audio input unit, a reference numeral 116 denotes a call start/end button, a reference numeral 117 denotes a CPU, a reference numeral 118 denotes a memory, a reference numeral 301 denotes a reception preset processing unit, a reference numeral 401 denotes a vibrator control unit, and a reference numeral 402 denotes a vibrator.

The vibrator control unit 401 and the vibrator 402 are used for informing of the reception of a mobile phone call as well. This is well known art, and therefore will not be elaborated here.

According to the fourth embodiment of the present invention, when a program preset for reception starts via the preset function of the reception preset processing unit 301, the event analysis processing unit 112 receives a reception start event, and judges whether or not the user is on the telephone.

When the user is on the telephone, an instruction message (vibrator start instruction) is transmitted to the vibrator control unit 401, instructing to turn on the vibrator, and the vibrator control unit 401 makes the vibrator 402 start.

The same operations as those of the first embodiment of the present invention follow subsequently.

The thus configured hybrid terminal of a mobile phone and a digital broadcast receiver allows the user on the phone to know the start of a program preset for reception easily by applying the vibrator, which is designed originally for notifying of the reception of a mobile phone call, to the start notification of a program preset for reception as well.

It is desirable that the hands free mode is selected for calling as discussed in the second embodiment.

With reference to the first to fourth embodiments, descriptions were given of the hybrid terminal of a mobile phone and a digital broadcast receiver as an example. Alternatively, however, the mechanisms discussed in the first to fourth embodiments are also applicable to a hybrid terminal of a wired fixed telephone and a digital broadcast receiver.

Further with reference to the first to fourth embodiments, descriptions were given of the hybrid terminal receiving digital broadcasts as an example. Alternatively, however, the mechanism discussed in the first to fourth embodiments is also applicable to a hybrid terminal receiving analog broadcasts.

Still further with reference to the first to fourth embodiments, descriptions were given of the communication apparatus according to this invention as an example. Alternatively, however, a communication method may also be implemented according to this invention based on the processing procedures discussed in the first to fourth embodiments.

Now, the characteristics of the hybrid terminal discussed in the first to fourth embodiment will be reiterated below.

The hybrid terminal discussed in the first to fourth embodiments is characterized by including the tuner unit for receiving a digital broadcast, the digital broadcast demodulating unit for demodulating the digital broadcast, the multiplexed transmission separating unit for separating multiplexed transmission data, the program information processing unit for analyzing the program information, instructing the digital broadcast tuner unit to select a station and instructing the multiplexed transmission separating unit to carry out the separation, the caption/data broadcast processing unit for decoding a caption data broadcast separated by the multiplexed transmission separating unit, the digital broadcast video processing unit for decoding a video broadcast also separated by the multiplexed transmission separating unit, the digital broadcast audio processing unit for decoding digital broadcast audio separated alike by the multiplexed transmission separating unit, the display superimposing unit for superimposing the caption/data broadcast onto the video broadcast, the telephone RF unit for carrying out telephone wireless processing, the telephone audio processing unit for processing telephone audio, the event analysis processing unit for analyzing/processing the receive/send event of a call, the audio path switching control unit for switching between the digital broadcast audio output and the telephone audio output, and the audio output unit.

Then, the hybrid terminal is characterized by switching the audio path to the telephone side, displaying a caption, and allowing calling, in the case of receiving a call while at the same time receiving a digital broadcast, and in the case where the call is finished, switching the audio path to the digital broadcast audio side, deleting the caption, and displaying the digital broadcast video alone.

The hybrid terminal discussed in the first embodiment is characterized in that, upon receiving a call while at the same time receiving a digital broadcast, the event analysis processing unit makes a request to the program information processing unit for displaying the caption separated and stopping separating the digital broadcast audio/muting, and the event analysis processing unit also makes a request to the audio path switching control unit for switching the audio path, so that the caption display and the audio path are switched.

The hybrid terminal discussed in the first embodiment is characterized in that, upon transmitting a call while at the same time receiving a digital broadcast, the event analysis processing unit makes a request to the program broadcast processing unit for displaying the caption, and the event analysis processing unit also makes a request to the audio path switching control unit for switching the audio path, so that the caption display and the audio path are switched.

The hybrid terminal discussed in the second embodiment is characterized by adding the hands free control unit, muting and displaying the caption upon receiving a call while at the same time receiving a digital broadcast, and switching at the same time to the hands free mode.

The hybrid terminal discussed in the third embodiment is characterized by adding the reception preset processing unit, and also characterized in that the program information processing unit outputs the caption instead of the audio when a program preset for reception starts while the phone is used at the same time.

The hybrid terminal discussed in the fourth embodiment is characterized by adding the vibrator control unit and the vibrator, and also characterized in that, when a program preset for reception starts while the user is on the telephone at the same time, the start of the program is notified to the user via the vibrator, and the program information processing unit outputs the caption instead of the audio.

INDUSTRIAL APPLICABILITY

Thus, according to the present invention, in the case where the receive event or the send event is generated while the multiplexed data is received, the audio output is switched so that the received telephone audio data is outputted, and in the case where the end event is generated while the multiplexed data is received, the audio output is switched so that the extracted audio data is outputted. Hence, both receiving/outputting the multiplexed data and calling may be implemented.

Furthermore, according to the present invention, in the case where the receive event or the send event is generated while the multiplexed data is received, the extracted text data is started to be displayed, and in the case where the end event is generated while the multiplexed data is received, the extracted text data is stopped being displayed. Hence, the period of displaying text data may be minimized.

Still further according to the present invention, in the case where the receive event or the send event is generated while the multiplexed data is received, the amplified audio is outputted. Hence, both receiving/outputting the multiplexed data and calling may be implemented with hands free.

Still further according to the present invention, when telephone audio is being transmitted/received at the multiplexed data reception start time, switching to the extracted audio data is not performed. Hence, both receiving/outputting the multiplexed data and calling may be implemented even in the event that the reception is started of the multiplexed data while the phone is used at the same time.

Still further according to the present invention, when telephone audio data is being transmitted/received at the multiplexed data reception start time, the vibrator is started. Hence, the start of receiving the multiplexed data may be notified via the vibrator even in the event that the reception is started of the multiplexed data while the phone is used at the same time.

The invention claimed is:

1. A communication apparatus comprising:
    a multiplexed data receiving unit for receiving multiplexed data at least including audio data;
    an extracting unit for extracting the audio data from the multiplexed data;
    a telephone unit for transmitting/receiving telephone audio data;
    an audio output unit for inputting one of extracted audio data that was extracted by the extracting unit and received telephone audio data that was received by the telephone unit, and outputting one of the extracted audio data inputted and the received telephone audio data inputted;

a switching control unit for switching an input to the audio output unit between the extracted audio data and the received telephone audio data; and an instructing unit for detecting a receive event generation, a send event generation, and an end event generation, and giving a prescribed instruction to the telephone unit, the extracting unit, and the switching control unit, wherein the instructing unit, in a case of detecting one of the receive event generation and the send event generation while the multiplexed data is being received by the multiplexed data receiving unit, transmits a telephone audio data transmission/reception start instruction to the telephone unit to start transmitting/receiving the telephone audio data, transmits an audio data extraction stop instruction to the extracting unit to stop extracting the audio data from the multiplexed data, and transmits a received telephone audio data switch instruction to the switching control unit to switch to the received telephone audio data, and in a case of detecting the end event generation while the multiplexed data is being received by the multiplexed data receiving unit, transmits a telephone audio data transmission/reception stop instruction to the telephone unit to stop transmitting/receiving the telephone audio data, transmits an audio data from the multiplexed data extraction start instruction to the extracting unit to start extracting the audio data, and transmits an extracted audio data switch instruction to the switching control unit to switch to the extracted audio data, wherein the telephone unit, in a case of receiving the telephone audio data transmission/reception start instruction from the instructing unit, starts transmitting/receiving the telephone audio data, and in a case of receiving the telephone audio data transmission/reception stop instruction from the instructing unit, stops transmitting/receiving the telephone audio data, wherein the extracting unit, in a case of receiving the audio data extraction stop instruction from the instructing unit, stops extracting the audio data from the multiplexed data, and in a case of receiving the audio data extraction start instruction, starts extracting the audio data from the multiplexed data, and wherein the switching control unit, in a case of receiving the received telephone audio data switch instruction from the instructing unit, switches the input to the audio output unit to the received telephone audio data, and in a case of receiving the extracted audio data switch instruction from the instructing unit, switches the input to the audio output unit to the extracted audio data.

2. The communication apparatus according to claim 1, wherein the multiplexed data receiving unit receives multiplexed data including video data and text data, and wherein the extracting unit extracts the video data from the multiplexed data, and also extracts the text data in a prescribed case, the communication apparatus, further comprising:

a display output unit for outputting extracted video data that was extracted by the extracting unit, and for outputting extracted text data in a case where the text data was extracted by the extracting unit, wherein the instructing unit transmits a text data extraction start instruction to the extracting unit to start extracting the text data in a case of detecting one of the receive event generation and the send event generation while the multiplexed data is received by the multiplexed data receiving unit, and transmits a text data extraction stop instruction to the extracting unit to stop extracting the text data in a case of detecting the end event generation while the multiplexed data is received by the multiplexed data receiving unit, and wherein the extracting unit starts extracting the text data in a case of receiving the text data extraction start instruction from the instructing unit, and stops extracting the text data in a case of receiving the text data extraction stop instruction from the instructing unit.

3. The communication apparatus according to claim 1, wherein the audio output unit is an amplified audio output unit for amplifying volume of and then outputting one of the extracted audio data inputted and the received telephone audio data inputted and outputting, the communication apparatus, further comprising:

a ear audio output unit for outputting the received telephone audio data in a prescribed case; and an amplified audio ear audio selecting unit for selecting one of the amplified audio output unit and the ear audio output unit, and making the one of the amplified audio output unit and the ear audio output unit output the received telephone audio data based on a selected result;

wherein the instructing unit transmits an amplified audio select instruction to the amplified audio ear audio selecting unit to select the amplified audio output unit, in a case of detecting one of the receive event generation and the send event generation while the multiplexed data is being received by the multiplexed data receiving unit, and wherein the amplified audio ear audio selecting unit selects the amplified audio output unit in a case of receiving the amplified audio select instruction from the instructing unit, and makes the amplified audio output unit output the received telephone audio data.

4. The communication apparatus according to claim 1, further comprising:

a multiplexed data reception start time managing unit, for managing time for the multiplexed data receiving unit to start receiving the multiplexed data as multiplexed data reception start time, transmitting with an arrival of the multiplexed data reception start time a multiplexed data reception start instruction to the multiplexed data receiving unit to start receiving the multiplexed data, and transmitting a multiplexed data reception start notification to the instructing unit of a start of receiving the multiplexed data by the multiplexed data receiving unit;

wherein the multiplexed data receiving unit starts receiving the multiplexed data in a case of receiving the multiplexed data reception start instruction from the multiplexed data reception start time managing unit, and wherein the instructing unit judges whether the telephone audio data is being transmitted/received by the telephone unit upon receiving the multiplexed data reception start notification from the multiplexed data reception start time managing unit, and transmits the audio data extraction stop instruction to the extracting unit in a case where the telephone audio data is being transmitted/received by the telephone unit, so that the instructing unit does not transmits the extracted audio data switch instruction to the switching control unit.

5. The communication apparatus according to claim 2, further comprising:

a multiplexed data reception start time managing unit, for managing time for the multiplexed data receiving unit to start receiving the multiplexed data as multiplexed data reception start time, transmitting with an arrival of the multiplexed data reception start time a multiplexed data reception start instruction to the multiplexed data receiving unit to start receiving the multiplexed data, and transmitting a multiplexed data reception start notification to the instructing unit of a start of receiving the multiplexed data by the multiplexed data receiving unit;

wherein the multiplexed data receiving unit starts receiving the multiplexed data in a case of receiving the multiplexed data reception start instruction from the multiplexed data reception start time managing unit, and wherein the instructing unit judges whether the telephone audio data is being transmitted/received by the telephone unit upon receiving the multiplexed data reception start notification from the multiplexed data reception start time managing unit, and transmits the text data extraction start instruction to the extracting unit in a case where the telephone audio data is being transmitted/received by the telephone unit.

6. The communication apparatus according to claim 4, further comprising:

a vibrator; and a vibrator control unit for controlling the vibrator;

wherein the instructing unit judges whether the telephone audio data is being transmitted/received by the telephone unit in a case of receiving the multiplexed data reception start notification from the multiplexed data reception start time managing unit, and transmits a vibrator start instruction to the vibrator control unit to start the vibrator in a case where the telephone audio data is being transmitted/received by the telephone unit, and wherein the vibrator control unit starts the vibrator in a case of receiving the vibrator start instruction from the instructing unit.

7. The communication apparatus according to claim 1, wherein the communication apparatus is a mobile communication apparatus.

8. A communication method, comprising:

a multiplexed data receiving step for receiving multiplexed data at least including audio data;

an extracting step for extracting the audio data from the multiplexed data;

a telephone audio data transmitting/receiving step for transmitting/receiving telephone audio data;

an audio output step for inputting one of extracted audio data that was extracted by the extracting step and received telephone audio data that was received by the telephone audio data transmitting/receiving step, and outputting one of the extracted audio data inputted and the received telephone audio data inputted;

a switching control step for switching an input to the audio output step between the extracted audio data and the received telephone audio data; and an instructing step for detecting a receive event generation, a send event generation. and an end event generation, and giving a prescribed instruction to the telephone audio data transmitting/receiving step, the extracting step, and the switching control step, wherein the instructing step, in a case of detecting one of the receive event generation and the send event generation while the multiplexed data is being received by the multiplexed data receiving step, gives a telephone audio data transmission/reception start instruction to the telephone audio data transmitting/receiving step to start transmitting/receiving the telephone audio data, gives an audio data extraction stop instruction to the extracting step to stop extracting the audio data from the multiplexed data, and gives a received telephone audio data switch instruction to the switching control step to switch to the received telephone audio data, and in a case of detecting the end event generation while the multiplexed data is being received by the multiplexed data receiving step, gives a telephone audio data transmission/reception stop instruction to the telephone audio transmitting/receiving step to stop transmitting/receiving the telephone audio data, gives an audio data extraction start instruction to the extracting step to start extracting the audio data from the multiplexed data, and gives an extracted audio data switch instruction to the switching control step to switch to the extracted audio data, wherein the telephone audio transmitting/receiving step, in a case of receiving the telephone audio data transmission/reception start instruction from the instructing step, starts transmitting/receiving the telephone audio data, and in a case of receiving the telephone audio data transmission/reception stop instruction from the instructing step, stops transmitting/receiving the telephone audio data, wherein the extracting step, in a case of receiving the audio data extraction stop instruction from the instructing step, stops extracting the audio data from the multiplexed data, and in a case of receiving the audio data extraction start instruction, starts extracting the audio data from the multiplexed data, and wherein the switching control step, in a case of receiving the received telephone audio data switch instruction from the instructing step, switches the input to the audio output step to the received telephone audio data, and in a case of receiving the extracted audio data switch instruction from the instructing step, switches the input to the audio output step to the extracted audio data.

9. The communication method according to claim 8, wherein the multiplexed data receiving step receives multiplexed data including video data and text data, and wherein the extracting step extracts the video data from the multiplexed data, and also extracts the text data in a prescribed case, the communication method, further comprising:

a display output step for outputting extracted video data that was extracted by the extracting step, and in a case where the text data was extracted by the extracting step, outputting extracted text data that was extracted, wherein the instructing step gives a text data extraction start instruction to the extracting step to start extracting the text data in a case of detecting one of the receive event generation and the send event generation while the multiplexed data is received by the multiplexed data receiving step, and gives a text data extraction stop instruction to the extracting step to stop extracting the text data in a case of detecting the end event generation while the multiplexed data is received by the multiplexed data receiving step, and wherein the extracting step starts extracting the text data in a case of receiving the text data extraction start instruction from the instructing step, and stops extracting the text data in a case of receiving the text data extraction stop instruction from the instructing step.

10. The communication apparatus according to claim 5, further comprising:

a vibrator; and a vibrator control unit for controlling the vibrator;

wherein the instructing unit judges whether the telephone audio data is being transmitted/received by the telephone unit in a case of receiving the multiplexed data reception start notification from the multiplexed data reception start time managing unit, and transmits a vibrator start instruction to the vibrator control unit to start the vibrator in a case where the telephone audio data is being transmitted/received by the telephone unit, and wherein the vibrator control unit starts the vibrator in a case of receiving the vibrator start instruction from the instructing unit.

11. The communication apparatus according to claim 2, wherein the communication apparatus is a mobile communication apparatus.

12. The communication apparatus according to claim 3, wherein the communication apparatus is a mobile communication apparatus.

13. The communication apparatus according to claim 4, wherein the communication apparatus is a mobile communication apparatus.

14. The communication apparatus according to claim 5, wherein the communication apparatus is a mobile communication apparatus.

* * * * *